United States Patent

[11] 3,547,385

| [72] | Inventors | Robert D. Kindorf,<br>448 Scenic Ave., Piedmont, Calif. 94611,<br>and David O. Kindorf, 6757 Girvin Drive,<br>Oakland, Calif. 94611 |
|---|---|---|
| [21] | Appl. No. | 726,086 |
| [22] | Filed | May 2, 1968 |
| [45] | Patented | Dec. 15, 1970 |

[54] STRUCTUAL FORM FOR PIPE CLAMP SUPPORT
2 Claims, 3 Drawing Figs.

[52] U.S. Cl. .................................................. 248/62,
29/155, 52/720
[51] Int. Cl. .................................................... F16l 3/10
[50] Field of Search .......................................... 248/68, 58,
62, 246, 73, 247; 52/710, 720, 730, 732; 29/155

[56] References Cited
UNITED STATES PATENTS

| 3,039,569 | 6/1962 | Bohnsack | 52/730X |
|---|---|---|---|
| 3,178,775 | 4/1965 | Tassell | 52/720X |
| 1,762,112 | 6/1930 | White | 52/694 |
| 1,811,211 | 6/1931 | Peirce | 248/73X |

FOREIGN PATENTS

| 537,066 | 2/1957 | Canada | 52/710 |
|---|---|---|---|
| DAS.<br>1,150,422 | 6/1963 | Germany | 248/68 |

*Primary Examiner*—Chancellor E. Harris
*Attorney*—Fryer, Tjensvold, Feix, Phillips & Lempio ABSTRACT: A channel-type clamp support which enables a plurality of pipes or conduits to be secured in side-by-side relationship on two opposite sides of the support.

PATENTED DEC 15 1970  3,547,385
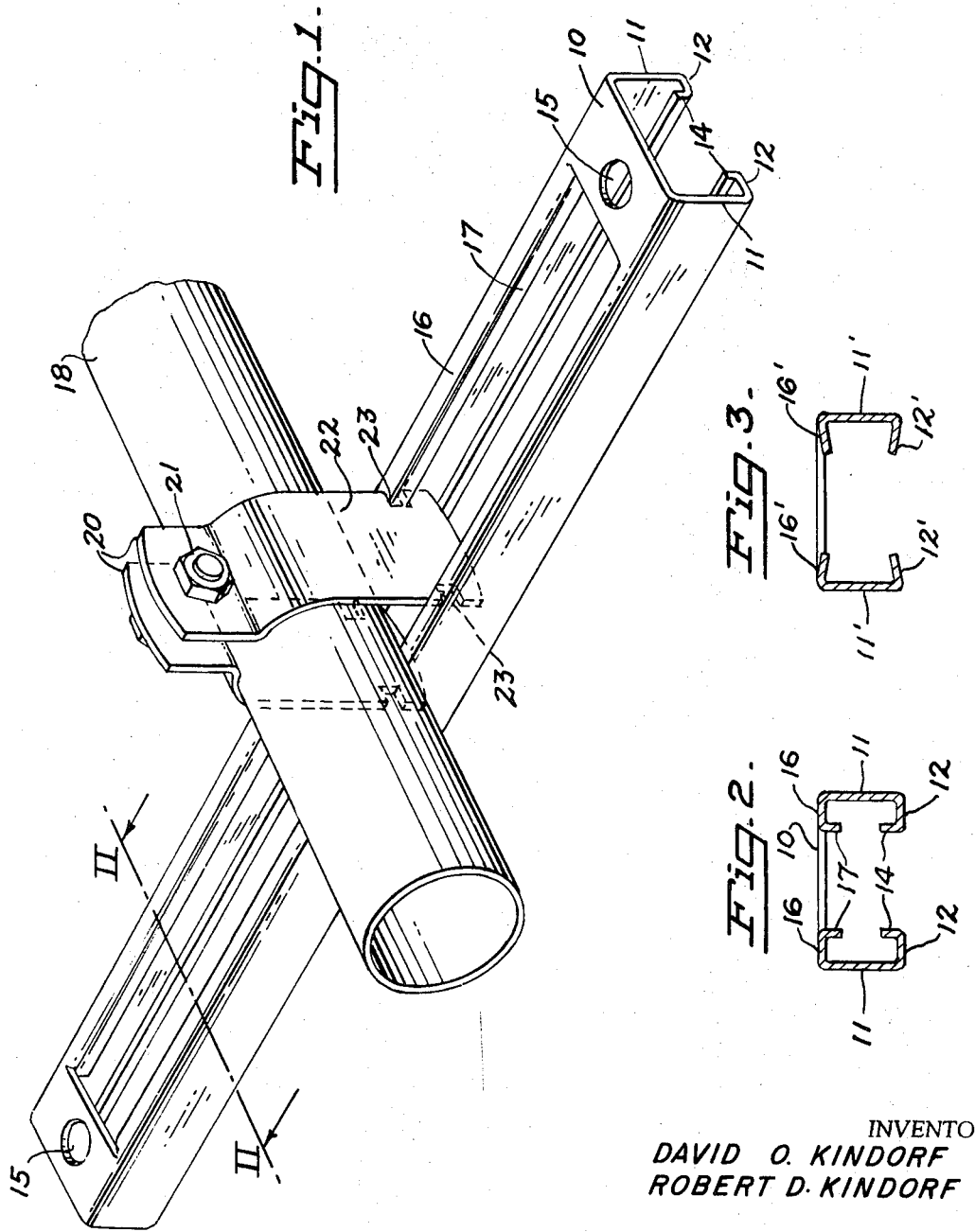
INVENTORS
DAVID O. KINDORF
ROBERT D. KINDORF
BY
*Fryer Tjensvold Feix Phillips, Lempio*
ATTORNEYS

STRUCTUAL FORM FOR PIPE CLAMP SUPPORT

Channel-shaped beams are commonly used for supporting pipe clamps, one example of such a beam being illustrated in our copending U.S. Pat. application for Multi-Purpose Pipe Clamp filed June 20, 1967, Ser. No. 647,558, now U.S. Pat. No. 346,428. Beams of the same general type are made by several manufacturers and are employed for supporting pipe, conduit and light fixtures as well as other equipment. In some cases, the beams are bolted together to form a frame work to which pipelines are secured with clamps and in other cases, they are used as so-called "trapeze" hangers being suspended in the manner of a horizontal bar from overhead structure by means of threaded rods or the like. Since the channel-shaped beams are slotted on one side only, it is customary to use pipe clamps only on that side since they were held in place partly by engagement with the edges of the slot. The most common type of beam is usually approximately square in cross section being about 1½inches on each side.

There is also a beam that is smaller being only about half the full size on the sides which are the legs of the channel, and it has been known to use two of these channel-shaped beams back to back so that when they are suspended, pipe may be clamped to two opposite sides so that the capacity for a given length is doubled.

It is the object of the present invention to provide a pipe clamp supporting beam of the kind generally described and to provide means on two opposite sides of the same beam for securing pipe clamps in place, thus greatly reducing the weight and the cost of the beam for a given capacity.

Further objects and advantages of the invention and the manner in which it is carried into practice are made apparent in the following specification by reference to the accompanying drawing.

In the drawing:

FIG. 1 is a perspective view of a pipe clamp support beam made in accordance with the present invention and shown with a single pipe and clamp in place thereon.

FIG. 2 is a sectional view taken on the line II–II of FIG. 1; and

FIG. 3 is a view like FIG. 2 showing an alternate form.

The channel-shaped beam as shown in FIG. 1 has a back 10 and opposed legs 11. In order to provide for engaging a pipe clamp with the beam, and also in some instances for special nuts which are used with such beams, the legs of the channel have their edges bent inwardly to form flanges 12. In the beam illustrated in the drawing, the extreme edges of the flanges 12 are bent toward the back of the beam as shown at 14. This enables the use of certain special nuts provided for beams of this type, but beams of other manufacturers are made without these parts 14 and employ nuts of different shapes. However, the particular shape of the flanges which are in the present case engaged by parts of the pipe clamp are of little importance in connection with the present invention which can be made with flanges of any known type.

Our intent is that the beam of the present invention be formed in predetermined lengths to avoid the necessity of cutting and punching holes at the site of installation. The back of the beam 10 is provided with a perforation 15 adjacent each of its ends for the reception of threaded rods or other means for suspending the beam. The greater portion of the beam between the perforations 15 is cut and bent away to provide flanges 16 with edges 17 thereon as best shown in FIG. 2 so that the flanges are identical in cross section with the flanges 12 and provide an intermediate slot of the same configuration and dimensions as the slot between the flanges 12. A typical pipe strap is shown in FIG. 1 as securing a pipe 18 in place on the supporting beam. The strap is made of two parts, each having a tab 20 which may be secured together as by a nut and bolt 21. Each part also has a leg 22, the end of which is provided with notches 23 which engage the flanges of the beam in a well-known manner while embracing the pipe and securing it to the beam. Some such clamps have more than one set of notches as for example, the clamp illustrated in our above-mentioned application for patent and such clamps may be utilized with the support beam of the present invention.

Because of the construction herein shown, a great deal of weight and metal is saved in a beam which has unusually high capacity. Also, since the back of the beam is cut and bent, two C-shaped channels, as are clearly evident in FIG. 2, lend strength to the beam structure.

The alternate form of the invention shown in FIG. 3 omits the inwardly bent edges 14 and 17 of FIG. 2 and merely bends the flanges 12' and 16' slightly beyond an angle which is normal to the plane of the walls 11'. This will adapt the support beams to fixtures and parts made by different manufacturers and either or both of the types of flanges shown in FIGS. 2 and 3 may be used.

While the support beam has been referred to as used in a trapeze type arrangement, it may also be suspended in a vertical position or may be included as a horizontal or vertical component of framework for supporting pipe or conduit.

We claim:

1. In a structural form for supporting pipe clamps which includes a beam of generally channel-shaped cross section with narrow flanges bent inwardly toward each other from the ends of the channel legs to produce a C-shaped cross section and provide a slot which extends longitudinally of the beam for the reception of pipe-clamping members which extend into the slot and into engagement with the flanges, the improvement which comprises the back of the beam having an elongated slot throughout the greater part of its length with flanges at the edges thereof similar to and spaced apart the same as those at the ends of the channel legs, the slot in the back of the channel terminating short of the ends of the channel and providing spaces for engagement of means to suspend the channel for reception of pipe-clamping members on two opposite sides of the channel.

2. A structural form as set forth in claim 1 in which at least one pair of flanges has narrow edges bent inwardly of the channel.